(12) United States Patent
Salter et al.

(10) Patent No.: US 9,845,047 B1
(45) Date of Patent: Dec. 19, 2017

(54) LIGHT SYSTEM

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/230,597

(22) Filed: Aug. 8, 2016

(51) Int. Cl.
*B60Q 1/26* (2006.01)
*B60Q 1/50* (2006.01)

(52) U.S. Cl.
CPC ..................................... *B60Q 1/50* (2013.01)

(58) Field of Classification Search
CPC .. B60Q 1/0011; B60Q 1/2619; B60Q 1/2661; B60Q 1/268; B60Q 1/2696; B60Q 1/30; B60Q 1/302; B60Q 1/50; B60Q 1/503; B60Q 3/208; B60Q 3/62; B60Q 3/64; B60Q 3/66; B60Q 3/68
USPC .......................... 362/487–488, 503, 508–510
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Jason Moon Han
(74) *Attorney, Agent, or Firm* — Jason Rogers; Price Heneveld LLP (57) ABSTRACT

A window for a vehicle is provided herein. The window includes an outer panel separated from an inner panel. A light guide is disposed between the outer panel and the inner panel. A first light-blocking layer is disposed between the light guide and the outer panel. A second light-blocking layer is disposed between the light guide and the inner panel. A light source is optically coupled with the light guide and is configured to direct excitation light towards a photoluminescent structure disposed between the first and second light-blocking layers. The photoluminescent structure luminesces in response to receiving the excitation light.

17 Claims, 6 Drawing Sheets

(56) References Cited

U.S. PATENT DOCUMENTS

| | | |
|---|---|---|
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,686,872 B2 | 4/2014 | Szczerba et al. |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,109,773 B2 | 8/2015 | Massault et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formosa |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 10350529 A1 | 3/2005 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

LIGHT SYSTEM

FIELD OF THE INVENTION

The present disclosure generally relates to vehicle light systems, and more particularly, to vehicle light systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a window for a vehicle is disclosed. The window includes an outer panel separated from an inner panel. A light guide is disposed between the outer panel and the inner panel. A first light-blocking layer is disposed between the light guide and the outer panel. A second light-blocking layer is disposed between the light guide and the inner panel. A light source is optically coupled with the light guide and is configured to direct excitation light towards a photoluminescent structure disposed between the first and second light-blocking layers. The photoluminescent structure luminesces in response to receiving the excitation light.

According to another aspect of the present invention, a window for a vehicle is disclosed. The window includes an outer panel. A light-blocking layer is disposed inwardly of the outer panel. A light guide is configured to direct light from a light source towards a photoluminescent structure disposed inwardly of the light-blocking layer. The photoluminescent structure luminesces in response to receiving excitation light from the light source.

According to yet another aspect of the present invention, a light system for a vehicle is disclosed. The light system includes an outer panel having a light-blocking layer attached to an inner surface thereof. A light source is optically coupled to a light guide. An indicia is disposed inwardly of the light-blocking layer. The indicia are defined by a photoluminescent structure that luminesces in response to receiving light from the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
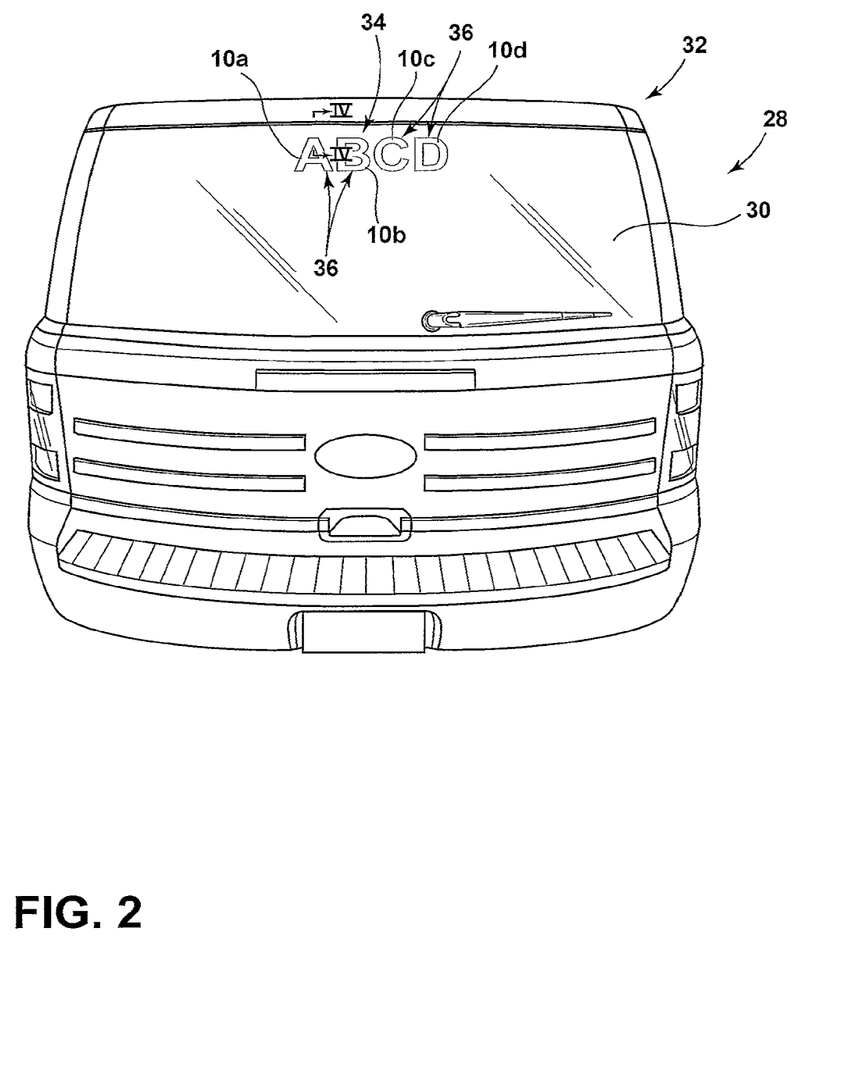
FIG. 2 is a rear perspective view of a vehicle light system, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system for a vehicle. The light system may advantageously employ one or more photoluminescent structures that luminesce in response to pre-defined events. The one or more photoluminescent structures may be configured to receive an excitation light and re-emit luminesce, or emit a converted light, at a different wavelength typically found in the visible wavelength spectrum.

Figure 1A:
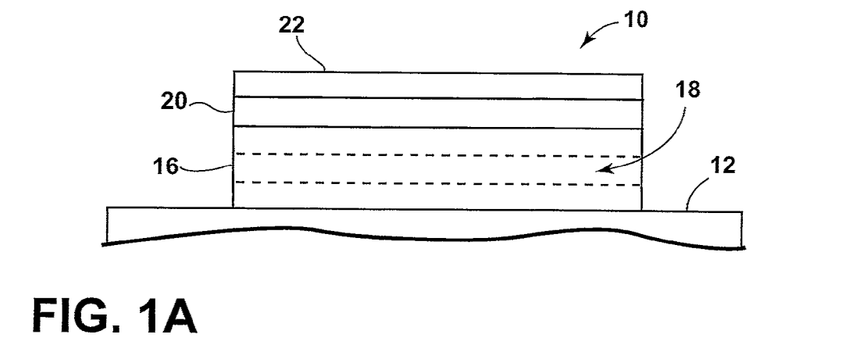
FIG. 1A is a side view of a photoluminescent structure rendered as a coating for use in a photoluminescent latch assembly according to one aspect.
Figure 1B:
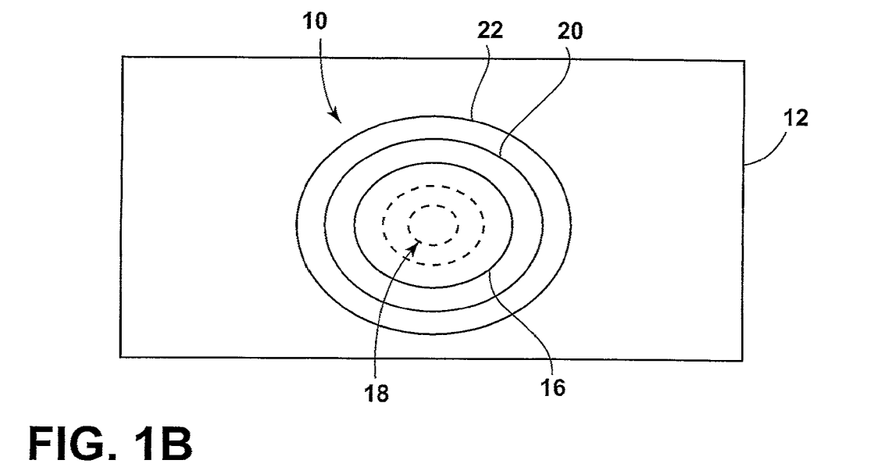
FIG. 1B is a top view of a photoluminescent structure rendered as a discrete particle according to one aspect.
Figure 1C:
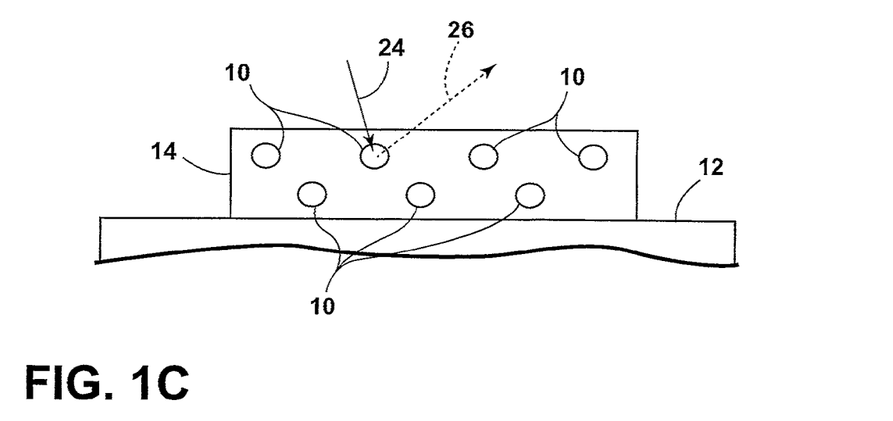
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, thereby luminescing in a converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 52 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4 D^1$ to $4 f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 52. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light source 52 that emits the excitation light 24. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring to FIG. 2, a vehicle light system 28 is shown according to one embodiment. The system 28 includes a window 30, such as a rear window, of a vehicle 32 and a photoluminescent structure 10 configured to luminesce in response to light excitation. The photoluminescent structure 10 may be disposed on a central portion 34, or any other portion, of the rear window 30 and is generally non-visible when in a non-excited state. According to the presently illustrated embodiment, photoluminescent structure 10 defines one or more indicia 36 that confer any desired information rearwardly of the vehicle 32. For example, the indicia 36 may define a notification symbol, or other information, to approaching vehicles when the photoluminescent structure luminesces.

Figure 3:
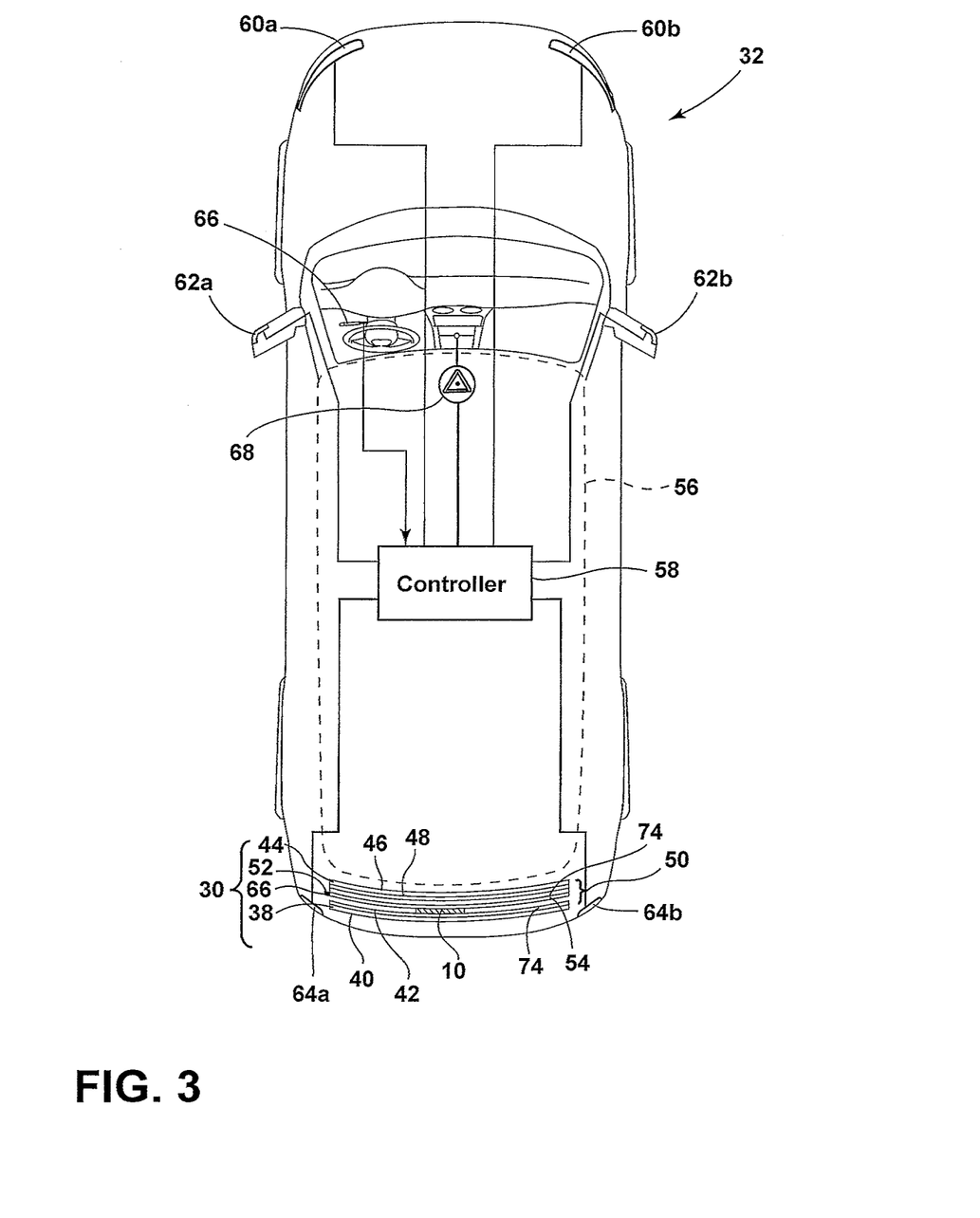
FIG. 3 is a top plan view of the vehicle employing the light system shown in FIG. 2.

Referring to FIG. 3, the window 30, which is shown in an enlarged view for illustrative purposes, includes a first or outer transparent and/or translucent panel 38. The outer panel 38 has a first side 40 or outer surface and a second side 42 or inner surface. The window 30 may also include a second or inner transparent and/or translucent panel 44. The inner panel 44 has a third side 46 or outer surface and a fourth side 48 or inner surface. The outer panel 38 and inner panel 44 are spaced from each other by a gap 50 therebetween of a predetermined thickness. It will be appreciated that each component of the window 30 provided herein may be of any thickness without departing from the scope of the present disclosure.

With further reference to FIG. 3, the photoluminescent structure 10 may be disposed within the gap 50, or otherwise arranged on the window 30. The light source 52, which may be disposed on a printed circuit board (PCB) 66 is operably, or optically, coupled with a light guide 54 that may also be disposed within the gap 50. The light guide 54 is configured to direct excitation light 24 towards the photoluminescent structure 10. In some embodiments, the light system 28 may employ additional light sources 52 and/or light guides for illuminating the photoluminescent structure 10, and consequently, indicia 36 independently. For example, the indicia 36 may form turn signals that may be illuminated by any of the light sources 52.

The light source 52 may be coupled to a headliner 56 of the vehicle 32, a trim panel proximately disposed to the window 30, or any other location and are selectively controlled by a controller 58, such as a vehicle body control module. In some embodiments, the light source 52 is concealed from view within the vehicle 32 by another component of the vehicle 32, which may also be disposed within the vehicle.

As shown in FIG. 3, the controller 58 also communicates and/or controls other vehicle equipment including, but not limited to, headlights 60a, 60b, side mirror lights 62a, 62b, taillights 64a, 64b, a turn signaling device (e.g., turn signal lever 72), and hazard switch 68. In operation, the headlights 60a, 60b, side mirrors lights 62a, 62b, taillights 64a, 64b, and the light source 52 are actuated based on a vehicle status signal. For example, the controller 58 may generate a hazard signal when the hazard switch 68 is switched ON. In such an instance, the hazard signal may prompt headlights 60a, 60b, side mirror lights 62a, 62b, and taillights 64a, 64b to blink in unison. Additionally, the light source 52 may be actuated to induce luminescence of the associated photoluminescent structure 10 such that the indicia 36 notify approaching vehicles of the hazard signal. The luminescence may occur so long as the hazard switch 68 is switched to ON.

According to one embodiment, light source 52 is actuated to supply light to the associated photoluminescent structure 10 such that the photoluminescent structure 10 luminesces intermittently. For instance, the light source 52 may be simultaneously actuated to periodically emit light toward the associated photoluminescent structure 10 such that the photoluminescent structure 10 luminesces in a similar blinking pattern as headlight 44a, side mirror light 46a, and taillight 48a. While not shown, it is further contemplated that the light source 52 may be actuated in any combination in conjunction with a brake signal or other vehicle status signal. Moreover, the indicia 36 may display any desired information without departing from the scope of the present disclosure.

With respect to the embodiments described herein, the light source 52 may each be configured to emit non-visible light, such as blue light, UV light, and/or violet light and may include any form of light source. For example fluorescent lighting, light emitting diodes (LEDs), organic LEDs (OLEDs), polymer LEDs (PLEDs), solid state lighting, or any other form of lighting configured to emit excitation light 24 may be utilized. In response, the photoluminescent structure 10 may be configured to convert excitation light 24 received from the associated light source 52 into light having a wavelength in the visible spectrum. According to one embodiment, each photoluminescent structure 10a-d is configured to convert UV light into red light having a wavelength of approximately 620-750 nanometers or any other visible light.

According to one embodiment, the photoluminescent structure 10 may be applied to the light guide 54 and/or a light-blocking layer 74 that is disposed between the light guide 54 and the outer panel 38 through a wide range of processes. For example, the photoluminescent material 18 may be applied to the light-blocking layer(s) 74 through painting, printing, spraying, slot coating, dip coating, roller coating, and bar coating. The light-blocking layer 74 may be embodied as a film configured to absorb ultraviolet (UV) radiation, thereby preventing sunlight from exciting the photoluminescent structure 10. In alternative embodiments, the light-blocking layer 74 may be configured to absorb light of a different wavelength(s). A second light-blocking layer(s) 74 may be disposed between the light guide 54 and the inner panel 44 in embodiments that include the outer and inner panels 38, 44.

Figure 4:
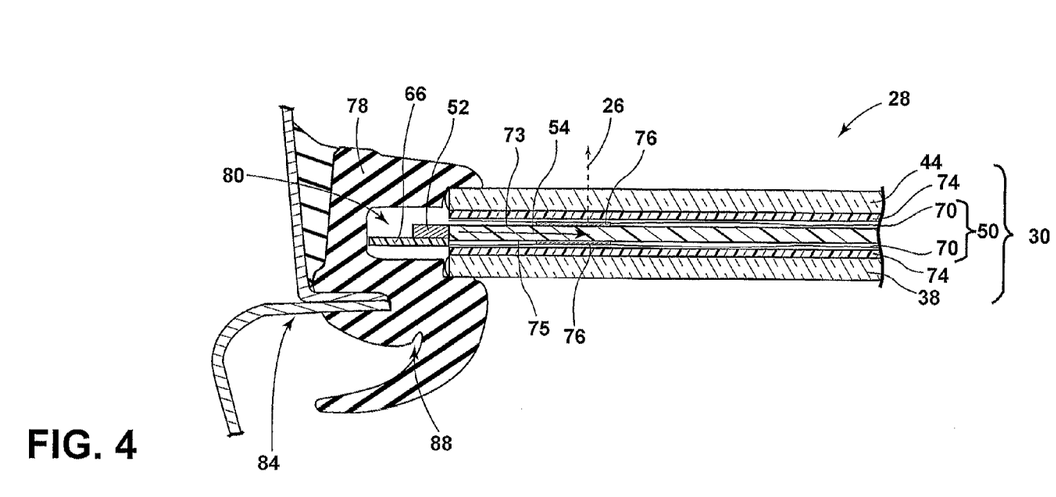
FIG. 4 is a cross-sectional view of the light system taken along the line IV-IV of FIG. 2 illustrating the light system, according to one aspect, having a light guide disposed between an outer panel and an inner panel.

Referring to FIG. 4, the light guide 54 is disposed inwardly of the outer panel 38 and may include a photoluminescent structure on a portion thereof, as discussed herein. Additionally, in some embodiments, the light guide 54 may be disposed between the outer panel 38 and the inner panel 44. In any event, the light guide 54 is a substantially transparent or translucent guide suitable for transmitting light (e.g., excitation light 24) and is operably coupled with the light source 52. The light source 52 may be provided on a flexible or rigid PCB 66 that is secured inside the vehicle 32.

The light guide 54 may be formed from a rigid material that is comprised of a curable substrate such as a polymerizable compound, a mold in clear (MIC) material or mixtures thereof. Acrylates are also commonly used for forming rigid light pipes, as well as poly methyl methacrylate (PMMA), which is a known substitute for glass. A polycarbonate material may also be used in an injection molding process to form the rigid light guide 54. Further, the light guide 54 may be a flexible light guide, wherein a suitable flexible material is used to create the light guide 54. Such flexible materials include urethanes, silicone, thermoplastic polyurethane (TPU), or other like optical grade flexible materials. Whether the light guide 54 is flexible or rigid, the light guide 54, when formed, is substantially optically transparent and/or translucent and capable of transmitting excitation light 24. The light guide 54 may be referred to as a light pipe, a light plate, a light bar or any other light carrying or transmitting substrate made from a clear or substantially translucent material.

The light-blocking layer 74 may be adhered to the outer panel 38, the inner panel 44, and/or the light guide 54 through an adhesive layer 70. The adhesive layer 70 may be an optically clear adhesive. As used herein, the term "optically clear" refers to an adhesive that has a high light transmittance over at least a portion of the visible light spectrum (about 400 to about 700 nanometers), and that exhibits low haze. Both the luminous transmission and the haze can be determined using, for example, the method of ASTM-D 1003-95. In one embodiment, the adhesive has about 10% haze or less, particularly about 5% haze or less, and more particularly about 2% haze or less.

In operation, the photoluminescent structure 10, which may be disposed on and/or within the light guide 54 and/or the light-blocking layer(s) 74, is formulated to become excited upon receiving excitation light 24 of a specific wavelength from the light source 52 that is directed through the light guide 54. As a result, the excitation light 24 undergoes an energy conversion process and is re-emitted at a different wavelength that may be transmitted through the light-blocking layer(s) 74.

The photoluminescent structure may be disposed on a first side 73 of the light guide 54, such as the outwardly facing side of the light guide 54. An opposing, second side 75 of the light guide 54 may include optics 76 thereon for assisting in directing excitation light 24 towards the photoluminescent structure 10. The optics 76 may be etched, molded, coupled to, or otherwise disposed on the light guide 54 such that additional light is directed towards the photoluminescent structure. The optics 76, according to one embodiment, are faintly etched onto the light guide 54 such that the optics 76 are not readily visible (i.e., easily noticeable at distances over two feet) to an onlooker of the light system 28.

Still referring to FIG. 4, a seal 78 may be disposed around a periphery of the window 30. According to one embodiment, the seal 78 may define a cavity 80 that may house the light source 52 and an offset and oppositely opening groove 82 adapted to receive a body and/or a roof flange 84 in order to retain the seal 78 member against separation from the vehicle body. The seal 78 is capable of carrying compression loads without being unduly deformed relative to its normal sealing position.

Figure 5:
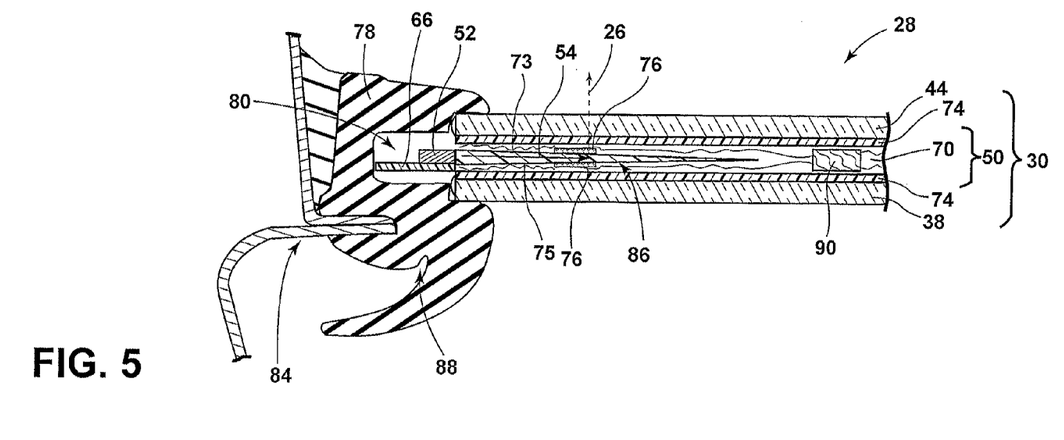
FIG. 5 is a cross-sectional view of the light system taken along the line IV-IV of FIG. 2 illustrating the light system, according to an alternate aspect, including a light guide having a tapered core disposed between an outer panel and an inner panel.

Referring to FIG. 5, the light guide 54 may have a tapered core 86 to direct excitation light 24 that is emitted from the light source 52 towards the photoluminescent structure. The tapered core 86 decreases in thickness in the direction in which the excitation light 24 is transmitted. As a result, the amount of excitation light 24 transmitted therethrough is increased. By using this arrangement, the diameter of the light beam, which originally is large, can be decreased prior to transmission through the light guide 54, simultaneously increasing the power density of the excitation light 24 towards the photoluminescent structure disposed on the light guide 54 and/or the light-blocking layer(s) 74. A dot pattern, a microstructure 88, and/or any other etched pattern are formed on the opposing surface of the light guide 54 to diffuse light incident within the light guide 54 and further direct excitation light 24 towards the photoluminescent structure.

In some embodiments, the thickness of the light-blocking layer(s) 74 may be non-uniform to compensate for various geometries of the light guide core 86 such that the outer and inner panels 38, 44 are separated from one another at a substantially constant distance. Additionally, or alternatively, the adhesive layer may vary in thickness to compensate for variances in thickness of the light-blocking layer(s) 74, the light guide 54, the optics 76, the photoluminescent structure, and/or any other component disposed within the gap 50. Moreover, in some embodiments, a spacer 90 may be utilized to maintain the gap 50 between the outer panel 38 and the inner panel 44.

Figure 6:
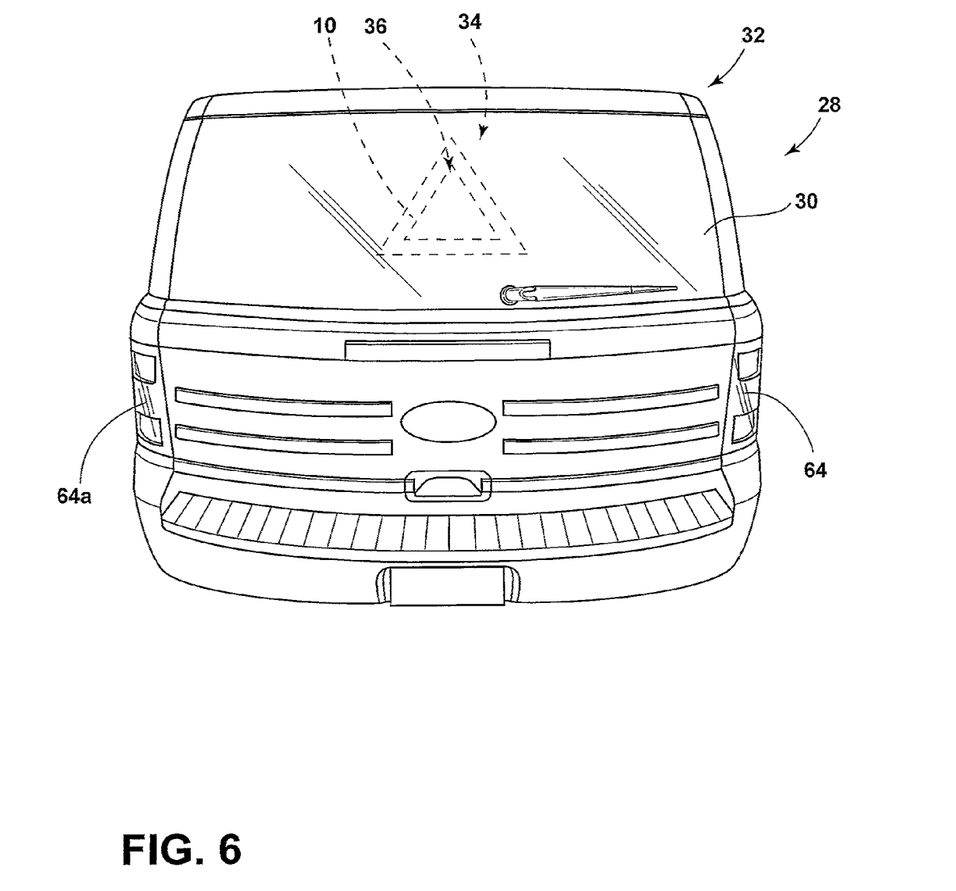
FIG. 6 is rear perspective view of the vehicle with the light system in an unilluminated state, according to one aspect.
Figure 7:
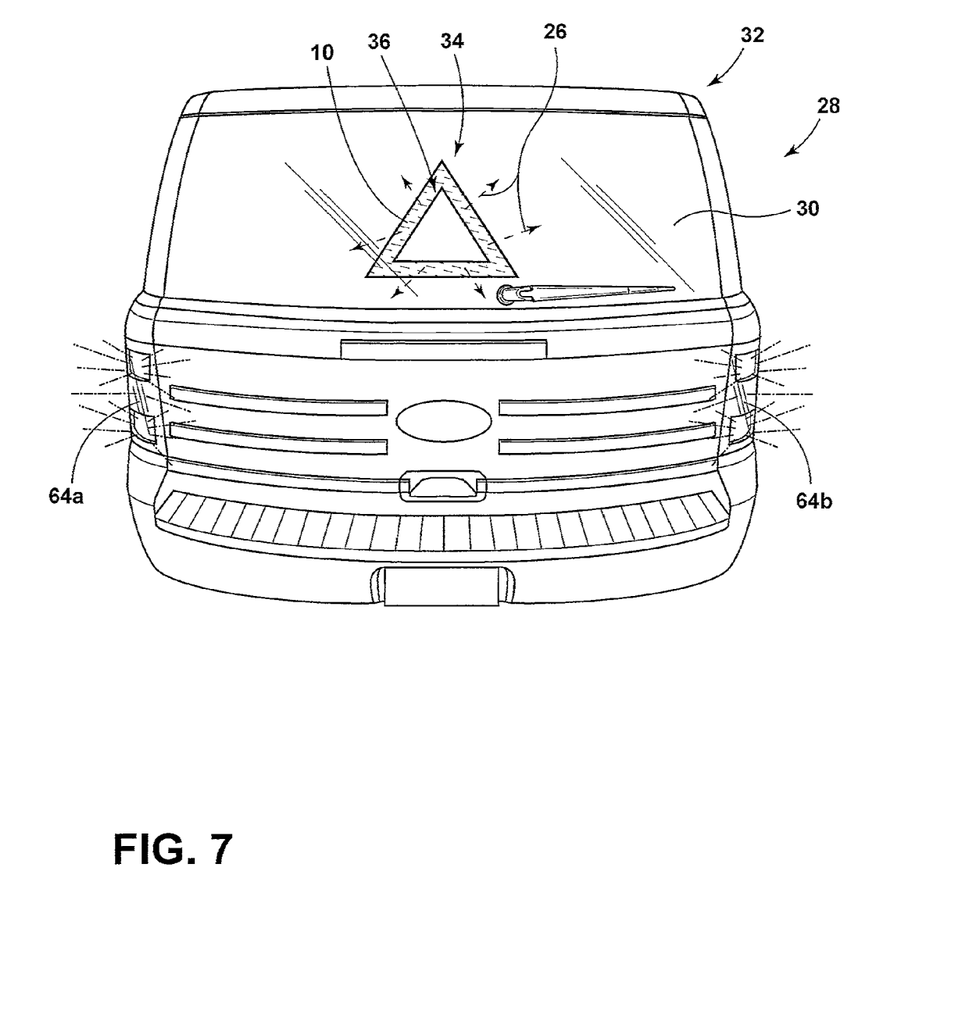
FIG. 7 is rear perspective view of the vehicle with the light system in an illuminated state, according to one aspect.

Referring to FIGS. 6 and 7, the indicia 36 are in the form of a highway safety triangle. The safety triangle is known in common use as a safety warning or hazard warning signal. Accordingly, when a vehicle occupant initiates a hazard switch 68 (FIG. 3) during a breakdown or accident to warn oncoming drivers of the approaching hazard, the indicia 36 luminesce. It will be appreciated, however, that the indicia 36 may additionally, or alternatively, form turn signals, insignia indicating a vehicle manufacturer, a user defined message, an image, a trademark, and/or any other desired information. Moreover, the light source 52 may emit a plurality of wavelengths of excitation light 24 that excite unique photoluminescent structures 10*a-d* (FIG. 2) such that more than one set of indicia 36 may independently luminesce.

With further reference to FIGS. 6 and 7, the outer panel 38, light-blocking layer(s) 74, light guide 54, and photoluminescent structure may be substantially transparent and/or non-visible when the light source 52 is unilluminated, as shown in FIG. 6. When a corresponding light source 52 is illuminated, the photoluminescent structure 10 may luminesce in response to receiving excitation light 24 from the light source 52, as shown in FIG. 7.

A wide range of photoluminescent materials 18 that luminesce in response to UV light, or any other wavelength of excitation light 24, may be substantially non-visible in an unexcited state, each of which may be utilized without departing from the scope of the present disclosure. Upon illumination of an associated light source 52, the photoluminescent material 18 may luminesce in the visible portion of the light spectrum. According to one embodiment, the photoluminescent structure 10 may include a mixture of UV light and infrared (IR) light excitable photoluminescent materials 18 therein that are capable of exciting the photoluminescent structure 10.

In some embodiments, the light source 52 may emit significant intensities of light that is transmitted through the light guide 54. The light-blocking layer(s) 74 maintain substantially all of the emitted excitation light 24 from exiting through the outer panel 38 and/or the inner panel 44. The significant intensities of light may be utilized to ensure that the photoluminescent structure 10 is luminescing near the full capacity of the photoluminescent structure 10 such that the indicia 36 are visible during all conditions. Since lighting conditions may vary depending on a plurality of factors including, but not limited to, the current time, date, and weather conditions, the intensity of excitation light 24 emitted from the light source 52 may be adjusted by the controller 58 such that illumination of the photoluminescent structure 10 may be noticed under any condition. For example, the light intensity in Florida during a clear summer afternoon will generally be higher than the light intensity in Michigan during an overcast winter morning. Thus, by making this type of information known to the controller 58, the controller 58 can adjust any Light source 52.

Accordingly, a light system incorporated within a trim panel has been advantageously provided herein. The trim panel retains its structural and protective properties while providing luminescent light having both functional and decorative characteristics.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate panels being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A window for a vehicle, comprising:
    an outer panel separated from an inner panel;
    a light guide disposed between the outer panel and the inner panel;
    a first light-blocking layer disposed between the light guide and the outer panel;
    a second light-blocking layer disposed between the light guide and the inner panel; and
    an ultraviolet light source optically coupled with the light guide and configured to direct excitation light towards a photoluminescent structure disposed between the first and second light-blocking layers, wherein the photoluminescent structure luminesces in response to receiving the excitation light, wherein the outer panel, the inner panel, the light guide and the first and second light-blocking layers form a window substrate of the vehicle.

2. The window for a vehicle of claim 1, wherein the first and second light-blocking layers block UV light from transmission therethrough.

3. The window for a vehicle of claim 2, wherein the window is a rear window.

4. The window for a vehicle of claim 1, wherein the photoluminescent structure comprises at least one photoluminescent material configured to convert the excitation light in a non-visible spectrum received from the light source into a visible, converted light.

5. The window for a vehicle of claim 1, wherein the photoluminescent structure defines indicia.

6. The window for a vehicle of claim 5, wherein the light source is actuated in conjunction with a hazard signal.

7. The window for a vehicle of claim 1, further comprising:
    optics disposed on an opposing side of the light guide from the photoluminescent structure.

8. A window for a vehicle, comprising:
    a light-blocking layer disposed inwardly of an outer panel; and
    a tapered light guide forming a window substrate of the vehicle with the light-blocking layer and the outer panel and configured to direct light from a light source towards a photoluminescent structure disposed inwardly of the light-blocking layer, wherein the photoluminescent structure defines visible indicia to approaching vehicles by luminescing upon receiving excitation light from the light source.

9. The window for a vehicle of claim 8, wherein the photoluminescent structure is substantially non-visible in an unexcited state.

10. The window for a vehicle of claim 8, further comprising:
    an inner panel disposed inwardly of the light guide.

11. The window for a vehicle of claim 10, further comprising:
    a light-blocking layer disposed between the inner panel and the light guide.

12. The window for a vehicle of claim 8, wherein a thicker first portion of the light guide is disposed proximately to the light source and a thinner second portion of the light guide is disposed further from the light source than the first portion.

13. A light system for a vehicle, comprising:
  an outer panel having a light-blocking layer on an inner surface thereof;
  a light source optically coupled to a light guide, the outer panel and light guide forming a vehicle window substrate; and
  an indicia disposed inwardly of the light-blocking layer and defined by a photoluminescent structure that luminesces upon receiving light from the light source that is directed towards the indicia by optics on the light guide.

14. The light system for a vehicle of claim 13, wherein the indicia is arranged to indicate one of a left turn and a right turn when in a luminescent state.

15. The light system for a vehicle of claim 14, wherein the light source is actuated intermittently such that the associated photoluminescent structures luminesce intermittently.

16. The light system for a vehicle of claim 13, wherein the light source is actuated in conjunction with a hazard signal.

17. The light system for a vehicle of claim 13, wherein the photoluminescent structure is substantially non-visible in an unexcited state.

* * * * *